(12) United States Patent
Williams

(10) Patent No.: US 6,878,088 B2
(45) Date of Patent: *Apr. 12, 2005

(54) ON-DEMAND TRANSFER CASE WITH BI-DIRECTIONAL CLUTCH ASSEMBLY

(75) Inventor: Randolph C. Williams, Weedsport, NY (US)

(73) Assignee: Magna Drivetrain of America, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/601,680

(22) Filed: Jun. 23, 2003

(65) Prior Publication Data

US 2003/0232690 A1 Dec. 18, 2003

Related U.S. Application Data

(63) Continuation of application No. 10/068,044, filed on Feb. 5, 2002, now Pat. No. 6,602,159.

(51) Int. Cl.$^7$ .............................. F16H 3/44
(52) U.S. Cl. .................. 475/303; 475/295; 475/299; 192/77
(58) Field of Search .................. 475/303, 295, 475/299, 208, 210; 180/247, 251; 192/38, 43, 77, 93 R

(56) References Cited

U.S. PATENT DOCUMENTS

| | | |
|---|---|---|
| 4,098,379 A | 7/1978 | Fogelberg et al. |
| 4,770,280 A | 9/1988 | Frost |
| 4,874,056 A | 10/1989 | Naito |
| 5,078,660 A | 1/1992 | Williams et al. |
| 5,284,068 A | 2/1994 | Frost |
| 5,323,871 A | 6/1994 | Wilson et al. |
| 5,346,442 A | 9/1994 | Eastman |
| 5,363,938 A | 11/1994 | Wilson et al. |
| 5,407,024 A | 4/1995 | Watson et al. |
| 5,411,447 A | 5/1995 | Frost |
| 5,582,263 A | 12/1996 | Varma et al. |
| 5,599,249 A * | 2/1997 | Zalewski et al. ........... 475/202 |
| 5,651,749 A | 7/1997 | Wilson et al. |
| 5,655,986 A | 8/1997 | Wilson et al. |
| 5,697,861 A | 12/1997 | Wilson |
| 5,700,222 A | 12/1997 | Bowen |
| 5,702,321 A | 12/1997 | Bakowski et al. |
| 5,704,863 A | 1/1998 | Zalewski et al. |
| 5,704,867 A | 1/1998 | Bowen |
| 5,738,604 A * | 4/1998 | Dick .......................... 475/206 |
| 5,836,847 A | 11/1998 | Pritchard |
| 5,884,526 A | 3/1999 | Fogelberg |
| 5,885,182 A * | 3/1999 | Forsyth ...................... 475/198 |
| 5,885,183 A * | 3/1999 | Pritchard et al. ........... 475/206 |
| 5,902,205 A | 5/1999 | Williams |
| 5,924,510 A | 7/1999 | Itoh et al. |
| 5,947,858 A | 9/1999 | Williams |
| 5,951,428 A | 9/1999 | Itoh et al. |
| 5,951,429 A | 9/1999 | Eastman |
| 5,992,592 A * | 11/1999 | Showalter .................. 192/43.1 |
| 5,993,592 A | 11/1999 | Perego |
| 6,022,289 A | 2/2000 | Francis |

(Continued)

OTHER PUBLICATIONS

Copy of provisional application 60/285,667 for 102(e) effective filing date Mar. 23, 2001 of patent 6,652,407.*
Copy of provisional application 60/279,089 for 102(e) effective filing date Mar. 27, 2001 of patent 6,612,957.*

*Primary Examiner*—Tisha Lewis
(74) *Attorney, Agent, or Firm*—Harness, Dickey & Pierce P.L.C.

(57) ABSTRACT

An on-demand two-speed transfer case is equipped with a planetary gearset assembly and a range shift mechanism to provide high-range and low-range drive connections. The transfer case is also equipped with a dual-mode bi-directional overrunning clutch and a mode shift mechanism to establish on-demand and part-time four-wheel drive modes.

32 Claims, 14 Drawing Sheets

U.S. PATENT DOCUMENTS

| | | |
|---|---|---|
| 6,056,666 A | 5/2000 | Williams |
| 6,062,361 A | 5/2000 | Showalter |
| 6,079,535 A * | 6/2000 | Mueller et al. ............ 192/48.2 |
| 6,092,635 A | 7/2000 | McCarthy et al. |
| 6,113,512 A | 9/2000 | Williams |
| 6,123,183 A | 9/2000 | Ito et al. |
| 6,132,332 A | 10/2000 | Yasui |
| 6,152,848 A | 11/2000 | Williams et al. |
| 6,283,887 B1 | 9/2001 | Brown et al. |
| 6,354,977 B1 * | 3/2002 | Brown et al. ............... 475/204 |
| 6,575,866 B2 * | 6/2003 | Bowen .......................... 475/5 |
| 6,602,159 B1 * | 8/2003 | Williams ..................... 475/303 |
| 6,612,957 B2 * | 9/2003 | Bansbach et al. ........... 475/204 |
| 6,652,407 B2 * | 11/2003 | Ronk et al. ................. 475/204 |
| 6,719,109 B1 * | 4/2004 | Li et al. ..................... 192/3.52 |
| 2002/0157889 A1 | 10/2002 | Mackle et al. |
| 2003/0051959 A1 | 3/2003 | Blair |
| 2003/0195080 A1 * | 10/2003 | Williams ..................... 475/295 |

\* cited by examiner

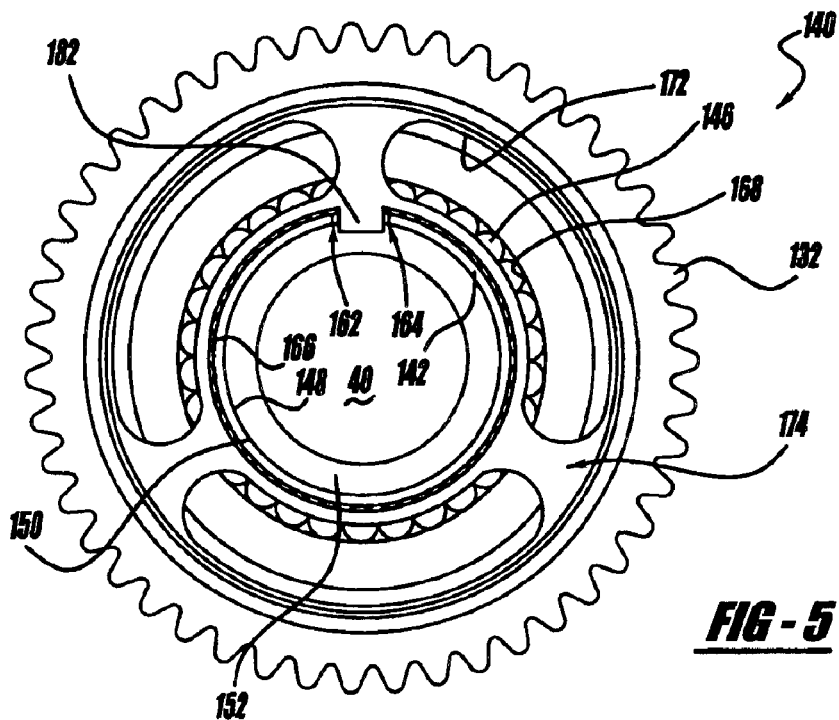
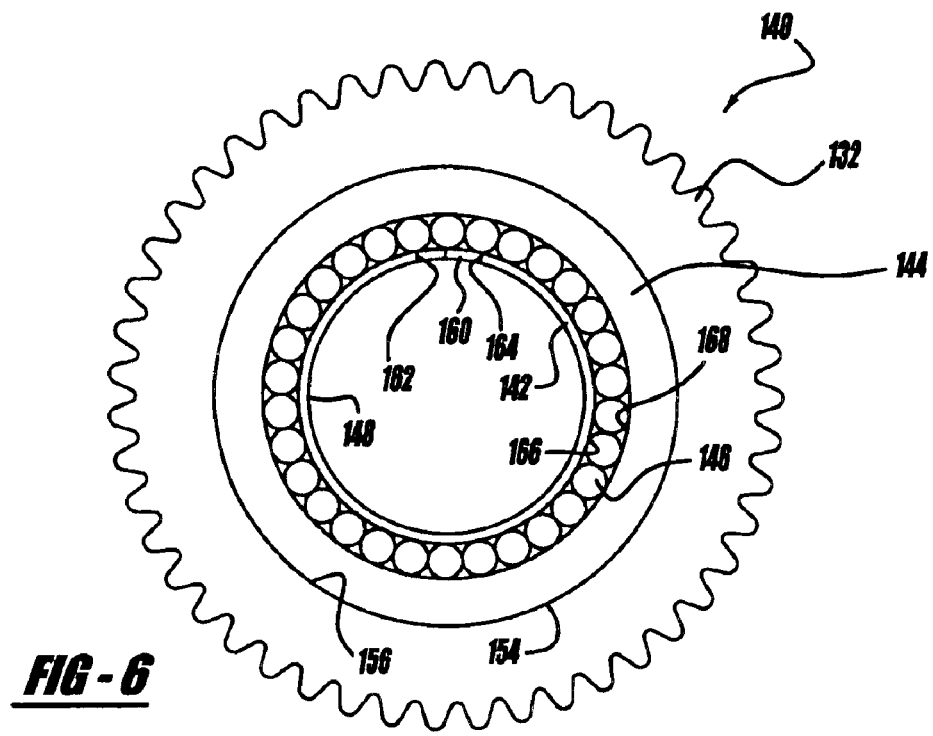

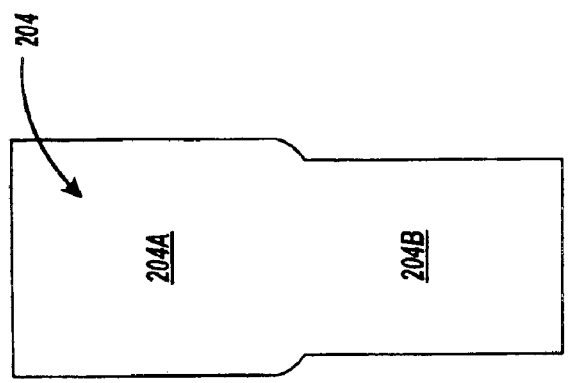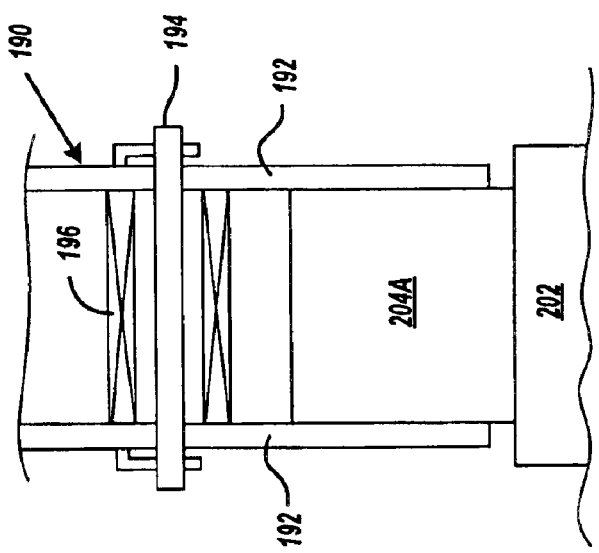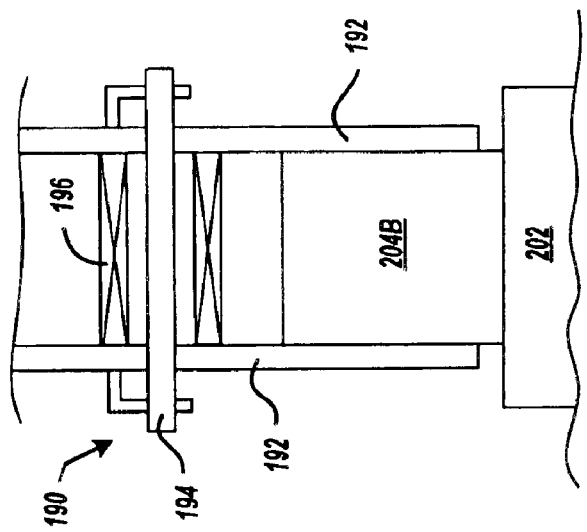

ON-DEMAND TRANSFER CASE WITH BI-DIRECTIONAL CLUTCH ASSEMBLY

CROSS-REFERENCE TO RELATED APPLICATIONS

This application is a continuation of U.S. patent application Ser. No. 10/068,044 filed on Feb. 5, 2002, now U.S. Pat. No. 6,602,159.

FIELD OF THE INVENTION

The present invention relates generally to a power transfer system for controlling the distribution of drive torque between the primary and secondary drivelines of a four-wheel drive vehicle. More particularly, the present invention relates to an on-demand transfer case having a two-speed gear reduction unit, a range shift mechanism for establishing high-range and low-range drive modes, and a controllable bi-directional overrunning mode clutch for controlling torque transfer from the primary driveline to the secondary driveline.

BACKGROUND OF THE INVENTION

Four-wheel drive vehicles are in great demand due to the enhanced on and off road traction control they provide. In many four-wheel drive vehicles, a transfer case is installed in the drivetrain and is normally operable to deliver drive torque to the primary driveline for establishing a two-wheel drive mode. The transfer case is further equipped with a clutch assembly that can be selectively or automatically actuated to transfer drive torque to the secondary driveline for establishing a four-wheel drive mode. These "mode" clutch assemblies can range from a simple dog clutch that is operable for mechanically shifting between the two-wheel drive mode and a "locked" (i.e., part-time) four-wheel drive mode to a more sophisticated automatically-actuated multi-plate clutch for providing an "on-demand" four-wheel drive mode.

On-demand four-wheel drive systems are able to provide enhanced traction and stability control and improved operator convenience since the drive torque is transferred to the secondary driveline automatically in response to lost traction at the primary driveline. An example of passively-controlled on-demand transfer case is shown in U.S. Pat. No. 5,704,863 where the amount of drive torque transferred through a pump-actuated clutch pack is regulated as a function of the interaxle speed differential. In contrast, actively-controlled on-demand transfer cases include a clutch actuator that is adaptively controlled by an electronic control unit in response to instantaneous vehicular operating characteristics detected by a plurality of vehicle sensors. U.S. Pat. Nos. 4,874,056, 5,363,938 and 5,407,024 disclose various examples of adaptive on-demand four-wheel drive systems.

Due to the cost and complexity associated with actively-controlled clutch assemblies, recent efforts have been directed to the use of overrunning clutches that can be easily controlled to provide various operating modes. For example, U.S. Pat. No. 5,993,592 illustrates a pawl-type controllable overrunning clutch assembly installed in a transfer case and which can be shifted between various drive modes. U.S. Pat. No. 6,092,635 discloses a hydraulically-actuated multi-function controllable overrunning clutch assembly that is noted to be operable for use in vehicular power transmission mechanisms. Likewise, U.S. Pat. Nos. 5,924,510, 5,951,428, 6,123,183, and 6,132,332 each disclose a controllable multi-mode overrunning clutch installed in a transfer case and which is actuated using an electromagnetic clutch. In view of this recent interest, a need exists to continue development of controllable bi-directional overrunning clutch assemblies which provide improved structure, robust operation, and reduced packaging for use in four-wheel drive transfer cases.

SUMMARY OF THE INVENTION

It is therefore an object of the present invention to provide a transfer case for an on-demand four-wheel drive vehicle having a two-speed gear reduction unit and a range shift mechanism which can be selectively actuated for establishing various four-wheel high-range and low-range drive mode.

According to another object of the present invention, the two-speed transfer case includes a controllable multi-mode bi-directional overrunning clutch assembly which is for controlling the transfer of drive torque to the secondary driveline in response to the occurrence of traction loss at the wheels of the primary driveline.

It is a further object of the present invention to provide a power-operated actuator to control shifting of the bi-directional overrunning clutch assembly between its distinct modes in response to mode signals received by a controller.

The present invention is directed to integration of a controllable, multi-mode, bi-directional overrunning clutch assembly and a mode shift system into a four-wheel drive transfer case for limiting slip between a primary output shaft and a secondary output shaft. The clutch assembly includes a first ring journalled on a first rotary member, a second ring fixed to a second rotary member, and a plurality of rollers disposed in opposed cam tracks formed between the first and second rings. The first ring is split to define an actuation channel having a pair of spaced end segments. An actuator ring is moveable between positions engaged with and released from the end segments of the first ring. The mode shift system is operable to control movement of the actuator ring for establishing an automatic four-wheel drive mode and a locked four-wheel drive mode.

In accordance with one particular embodiment of the bi-directional overrunning clutch assembly of the present invention, the first ring is journalled on a sprocket driven by the secondary output shaft and the second ring is driven by the primary output shaft. Thus, the invention provides for installing the controllable, multi-mode, bi-directional overrunning clutch assembly in association with the sprocket of a transfer assembly to permit significant axial length reductions for the transfer case.

Further objects, advantages and features of the present invention will become readily apparent to those skilled in the art by studying the following description of the preferred embodiment in conjunction with the appended drawings which are intended to set forth the best mode currently contemplated for carrying out the present invention.

BRIEF DESCRIPTION OF THE DRAWINGS

FIG. 5 is a rear end of the mode clutch assembly shown in FIG. 4;

FIG. 6 is a view similar to FIG. 5 except that the actuator ring has been removed from the mode clutch assembly;

FIGS. 7A and 7B are partial end views of the drag band and actuator block associated with the mode shift mechanism;

FIG. 8 is a top plan view of the actuator block;

DETAILED DESCRIPTION OF THE PREFERRED EMBODIMENTS

Figure 1:
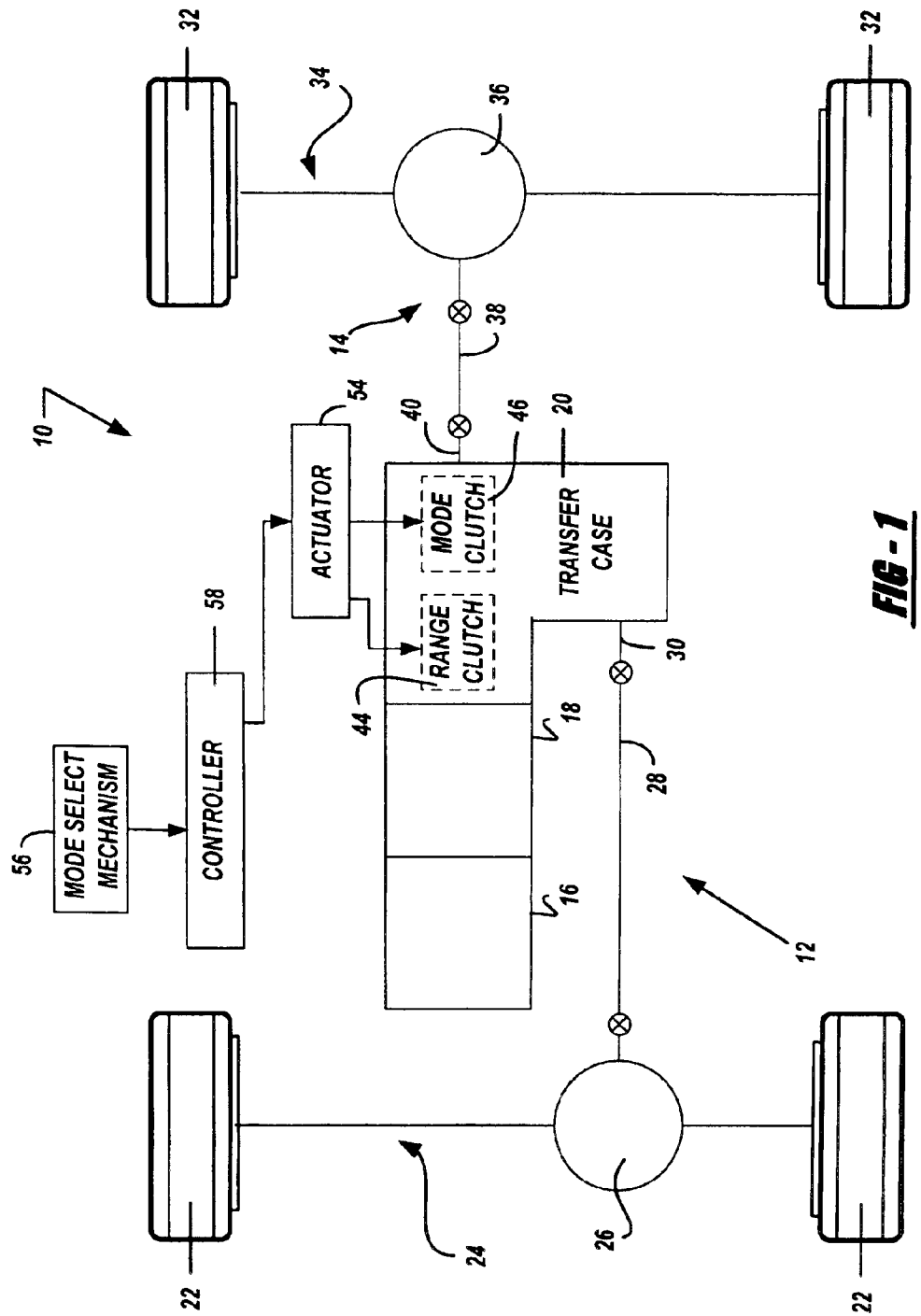
FIG. 1 is a schematic representation of a four-wheel drive motor vehicle equipped with an on-demand power transfer system according to the present invention.

Referring now to the drawings, a drivetrain for a four-wheel drive vehicle is schematically shown interactively associated with a power transfer system 10 of the present invention. The motor vehicle drivetrain includes a front driveline 12 and a rear driveline 14 both driveable from a source of power, such as an engine 16, through a transmission 18 which may be of the manual or automatic type. In the particular embodiment shown, the drivetrain includes a transfer case 20 for transmitting drive torque from engine 16 and transmission 18 to front driveline 12 and rear driveline 14. Front driveline 12 includes a pair of front wheels 22 connected at opposite ends of a front axle assembly 24 having a front differential 26 coupled to one end of a front drive shaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear drive shaft 38, the opposite end of which is interconnected to a rear output shaft 40 of transfer case 20.

As will be detailed hereinafter with greater specificity, transfer case 20 is equipped with a planetary gearset 42, a range clutch 44, and a mode clutch 46. Range clutch 44 is operable to couple components of planetary gearset 42 for driving a carrier 52 at either of a first (high-range) speed ratio or a second (low-range) speed ratio. Carrier 52 is shown to be fixed for rotation with rear output shaft 40. Mode clutch 46 is operable to control the speed differentiation and torque transfer between rear output shaft 40 and front output shaft 30. Power transfer system 10 further includes a power-operated actuator 54 for controlling coordinated actuation of range clutch 44 and mode clutch 46, a mode select mechanism 56 operable to permit the vehicle operator to select one of the available drive modes, and a controller 58 for controlling actuation of actuator 54. In particular, controller 58 functions to control actuation of power-operated actuator 54 in response to the mode signal sent to controller 58 from mode select mechanism 56 for establishing the particular mode selected.

Figure 2:
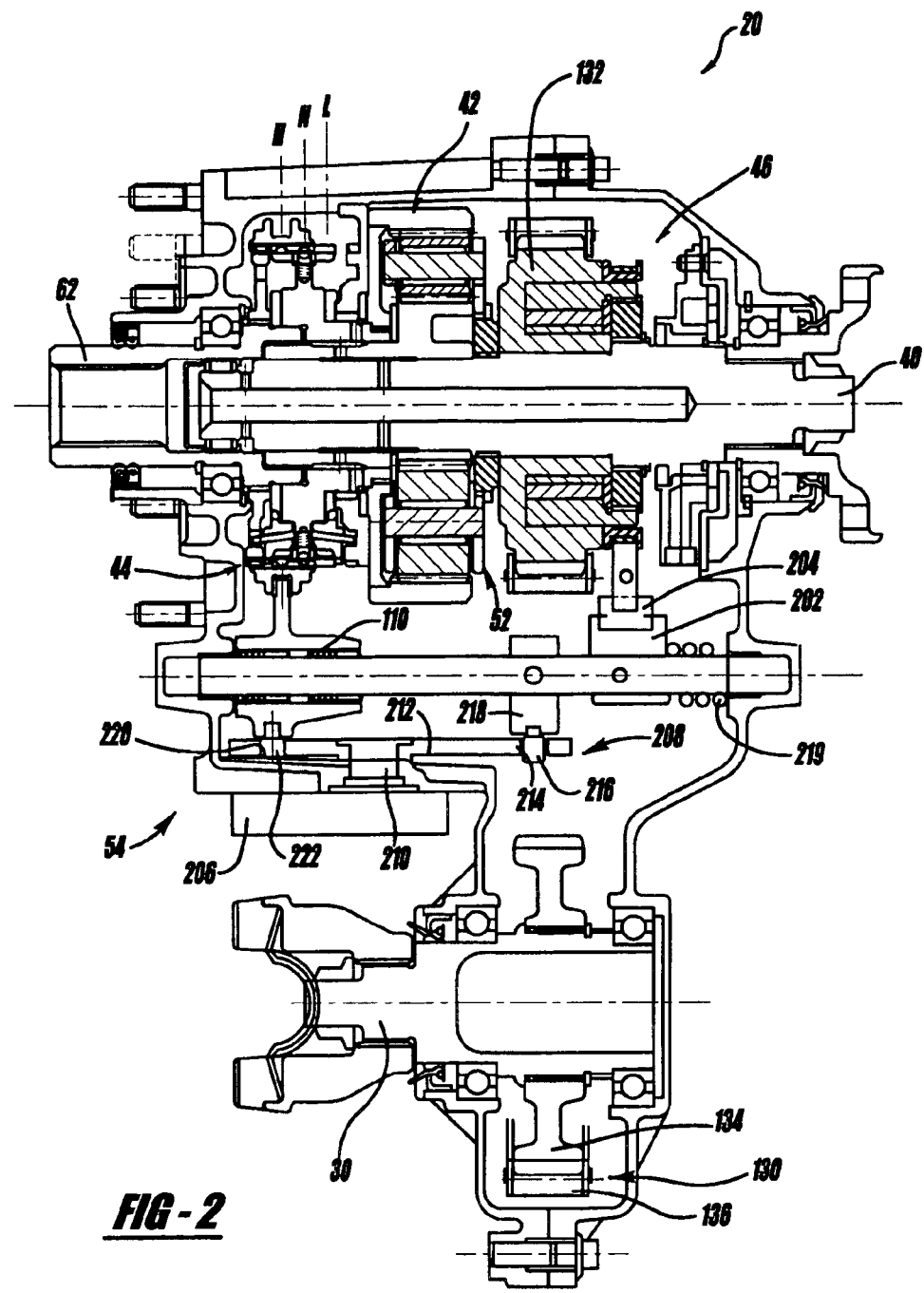
FIG. 2 is a sectional view of a two-speed transfer case constructed according to a preferred embodiment of the present invention.
Figure 3:
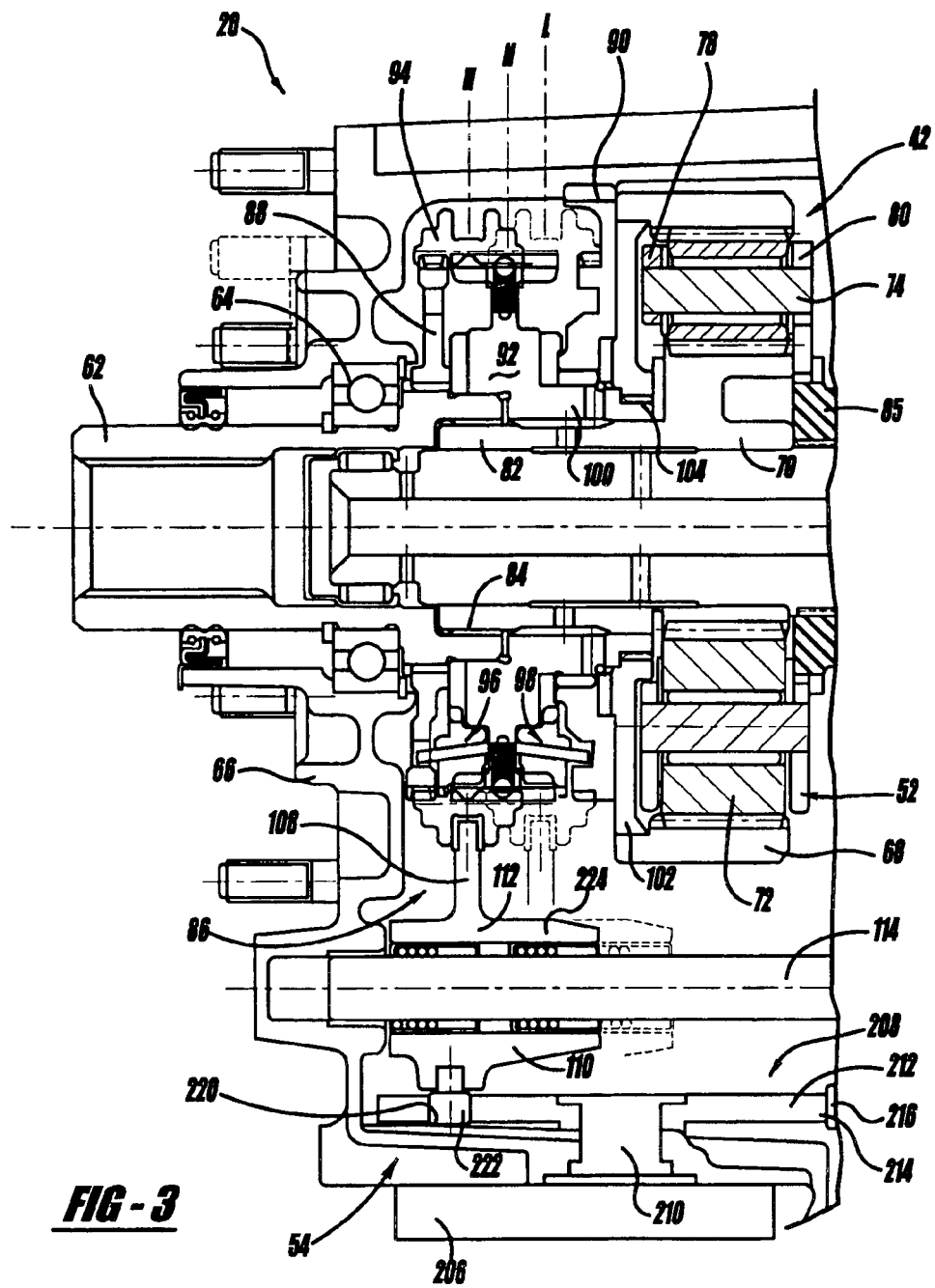
FIG. 3 is an enlarged partial view taken from FIG. 2 showing components of the planetary gear assembly and the range shift mechanism in greater detail.
Figure 4:
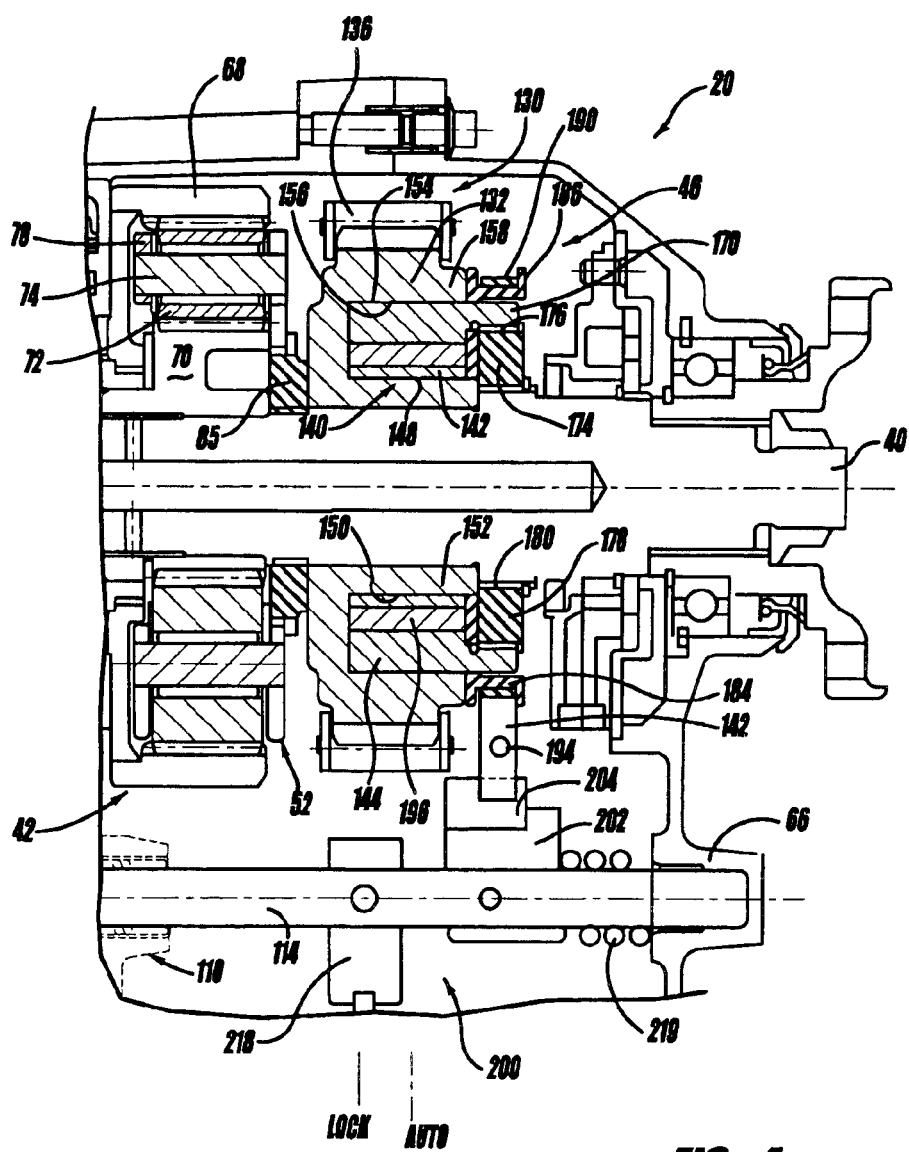
FIG. 4 is an enlarged partial view taken from FIG. 2 showing the components of the mode clutch assembly in greater detail.

With particular reference now to FIG. 2 through 4 of the drawings, transfer case 20 is shown to include an input shaft 62 rotatably supported by a bearing assembly 64 from a housing 66. Input shaft 62 is adapted for connection to an output shaft of transmission 18. Planetary gearset 42 includes a ring gear 68, a sun gear 70, and a set of planet gears 72 each meshed with ring gear 68 and sun gear 70. Planet gears 72 are rotatably supported on pins 74, each of which extends between first and second carrier rings 78 and 80, respectively, of carrier 52. A stub shaft segment 82 of sun gear 70 is shown fixed via a splined connection 84 for rotation with input shaft 62. Likewise, carrier ring 80 is coupled for rotation with rear output shaft 40 via a drive ring 85. Drive ring 85 has external splines meshed with internal splines on carrier ring 80 and internal splines meshed with external splines formed on rear output shaft 40.

Range clutch 44 is shown to include a range shift mechanism 86 having a first clutch plate 88 fixed to input shaft 62, a second clutch plate 90 fixed to housing 66, a clutch hub 92 rotatably journalled on portions of input shaft 62 and stub shaft segment 82 of sun gear 70, and a range sleeve 94 that is splined to clutch hub 92 for rotation therewith and axial sliding movement thereon between three distinct range positions. A non-synchronized version of range shift mechanism 86 is shown in the upper-half of FIG. 2. Preferably, however, range shift mechanism 86 is synchronized to permit "on-the-move" range shifts. Thus, a synchronized version of range shift mechanism 86 is shown in the lower-half of FIG. 2. This arrangement includes a first synchronizer 96 that is disposed between clutch hub 92 and first clutch plate 88, and a second synchronizer 98 disposed between clutch hub 92 and second clutch plate 90. Clutch hub 92 includes an axially extending shaft segment 100 that is rotatably journalled on stub shaft segment 82 of sun gear 70. A plate segment 102 of ring gear 68 is coupled to shaft segment 100 of hub clutch 92 via a splined connection 104.

As noted, range sleeve 94 is moveable between three distinct range positions which are shown by phantom position lines to include a high-range ("H") position, a low-range ("L") position, and a neutral ("N") position. Range sleeve 94 is shown in its H position in solid lines and in its L position in phantom lines. In addition, range shift mechanism 86 includes a range fork 110 which moves axially under the control of actuator 54 to control axial movement of range sleeve 94 between its three range positions. Range fork 110 includes a fork segment 108 that is shown retained in a groove formed in range sleeve 94. Range fork 110 also has a tubular segment 112 mounted on a shift rail 114, the opposite ends of which are retained for sliding movement in sockets formed in housing 66. As will be detailed, actuator 54 includes a drive mechanism which functions to move range fork 110 so as to cause corresponding axial movement of range sleeve 94 for establishing the different drive connections between input shaft 62 rear output shaft 40.

A first or high-range drive connection is established between input shaft 62 and rear output shaft 40 when range sleeve 94 is in its H position. With range sleeve 94 in its H position, its internal clutch teeth are engaged with external clutch teeth on first clutch plate 88. Thus, ring gear 68, sun gear 70 and carrier 52 are all commonly driven by input shaft 62. As such, rear output shaft 40 is driven at a common speed with input shaft 62 due to the coupling of carrier 52 to rear output shaft 40 through drive ring 85. A second or low-range drive connection is established between input shaft 62 and rear output shaft 40 when range sleeve 94 is in its L position. With range sleeve 94 in its L position, its internal clutch teeth are engaged with external clutch teeth formed on second clutch plate 90 such that ring gear 68 is braked against rotation. As such, carrier 52 and rear output shaft 40 are rotatively driven at a reduced speed relative to input shaft 62 due to ring gear 68 being braked. Finally, a neutral (non-driven) mode is established when range sleeve 94 is in its N position. With range sleeve 94 in its N position, ring gear 68 is released from coupled engagement with both input shaft 62 and housing 66 such that no drive torque is delivered to rear output shaft 40.

As best seen from FIGS. 4 through 7, mode clutch 46 is controllable, multi-mode, bi-directional overrunning clutch assembly 140 that is operably installed between a transfer assembly 130 and rear output shaft 40. In particular, transfer assembly 130 includes a drive sprocket 132 journalled on rear output shaft 40, a driven sprocket 134 fixed to front output shaft 30, and a power chain 136 interconnecting driven sprocket 134 to drive sprocket 132. Clutch assembly 140 is shown to be located within an annular chamber formed in drive sprocket 132 and includes an inner ring 142, an outer ring 144, and a plurality of cylindrical rollers 146. Inner ring 142, hereinafter referred to as a slipper ring, has an inner surface 148 concentrically mounted on an outer surface 150 of an inner rim segment 152 of drive sprocket 132. Likewise, outer ring 144 has an outer surface 154 concentrically aligned in close proximity to an inner surface 156 of an outer rim segment 158 of drive sprocket 132.

Slipper ring 142 is a split ring having an actuation slot 160 defining first and second end surfaces 162 and 164, respectively. A series of arcuate cam track 166 are formed on the outer surface of slipper ring 142 while a corresponding number of arcuate cam tracks 168 are formed in the inner surface of outer ring 144. Rollers 146 are located and retained between aligned sets of cam tracks 166 and 168. As best seen in FIG. 4, outer ring 144 has a plurality of arcuate flange segments 170 that extend through apertures 172 formed in an actuator ring 174. Flange segments 170 are secured via a spline connection 176 to a drive plate 178 which, in turn, is fixed via a spline connection 180 to rear output shaft 40. Thus, outer ring 144 is driven by rear output shaft 40.

Actuator ring 174 is located between drive sprocket 132 and drive plate 178 and includes a radial lug 182 that is retained within actuation slot 160 of slipper ring 142. Actuator ring 174 also includes a cylindrical rim 184 having an upstanding flange 186 to define a circumferential retention groove. Overrunning clutch assembly 140 further includes a drag band 190 which encircles and engages rim 184 on actuator ring 174 and which is retained within the retention groove. As best seen from FIGS. 7A and 7B, drag band 190 has a pair of ends 192 interconnected by a roll pin 194 and biased by a compression-type coil spring 196 to maintain a predetermined drag force on rim segment 184 of actuator ring 174. Drag band 190 is preferably made of brass or a suitable spring material.

Mode clutch 46 further includes a mode shift mechanism 200 having an actuator block 202 secured (i.e., pinned) to shift rail 114. A contoured camming lug segment 204 of actuator block 202 is disposed between, and its side surfaces engage, both ends 192 of drag band 190. In addition, spring 196 is arranged to urge band ends 192 into continuous contact with camming lug 204 of actuator block 202. As will be detailed, the contour of camming lug 204 functions to cause ends 192 of drag band 190 to move between a retracted position (FIG. 7A) and an expanded position (FIG. 7B) in response to axial movement of actuator block 202.

Preferably, actuator 54 includes a power-operated device, such as an electric gearmotor 206, which is operable for generating an output torque, the value of which varies as a function of the magnitude of the electrical control signal applied thereto by controller 58. To provide means for selectively controlling coordinated movement of range fork 110 and actuator block 202, actuator 54 also includes a drive mechanism 208. Drive mechanism 208 is interconnected to a rotary output member 210 of gearmotor 206 for changing its output torque into axially-directed forces that are used for controlling axial movement of range fork 110 and cam block 202. According to a preferred construction, drive mechanism 208 includes a sector plate 212 that is rotatably driven through a range of angular motion by output member 210 of gearmotor 206.

To generate axial movement of cam block 202, sector plate 212 includes a mode slot 214 within which a mode pin 216 is retained. Mode pin 216 is fixed to a mode fork 218 which, in turn, is fixed (i.e. pinned) to shift rail 114 for sliding movement therewith. The contour of mode slot 214 is configured to cause the desired direction and amount of axial sliding movement of mode fork 218 and shift rail 114 in response to rotation of sector plate 212. Since actuator block 202 is also fixed to shift rail 114, axial movement of mode fork 184 in response to rotation of sector plate 212 causes corresponding axial movement of actuator block 202. A biasing spring 219 surrounds shift rail and its ends engage housing 66 and actuator block 202 so as to bias mode pin 216 against mode slot 214. To control axial movement of range sleeve 94, sector plate 212 also has a range slot 220 within which a range pin 222 extends. Range pin 222 is fixed to a tubular segment 224 of range fork 110 which is shown supported by roller bearings for sliding movement on shift rail 114. The contour of range slot 220 is configured to cause controlled axial movement of range sleeve 94 between its three distinct range positions in response to rotation of sector plate 212.

According to a preferred embodiment of the present invention, sector plate 212 may be rotated to any one of five distinct sector positions to establish a corresponding number of drive modes. These drive modes include a part-time four-wheel high-range drive mode, an on-demand four-wheel high-range drive mode, a neutral mode, a part-time four-wheel low-range drive mode, and an on-demand four-wheel low-range drive mode. The particular four-wheel drive mode selected is established by the position of mode pin 216 within mode slot 214 and the position of range pin 222 within range slot 220. In operation, the vehicle operator selects a desired drive mode via actuation of mode select mechanism 56 which, in turn, sends a mode signal to controller 58 that is indicative of the selection. Thereafter, controller 58 generates an electric control signal that is applied to gearmotor 206 for controlling the rotated position of sector plate 212.

Mode select mechanism 56 can take the form of any mode selector device which is under the control of the vehicle operator for generating a mode signal indicative of the specific mode selected. In one form, the mode selector device may be in an array of dash-mounted push button switches. Alternatively, the mode selector may be a manually-operable shift lever sequentially moveable between a plurality of positions corresponding to the available operational modes which, in conjunction with a suitable electrical switch arrangement, generates a mode signal indicating the selected mode. In either form, mode select mechanism 56 offers the vehicle operator the option of deliberately choosing between the various operative drive modes.

Figure 9A:
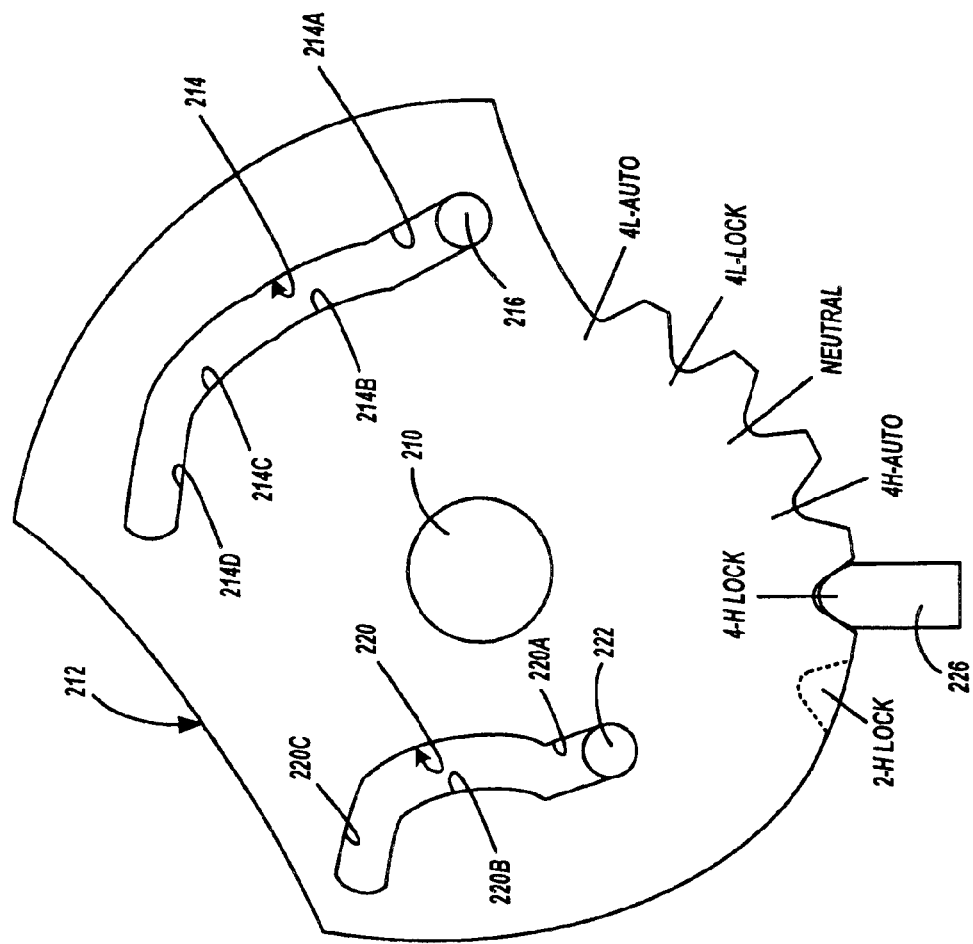
FIGS. 9A and 9B are side views of the drive mechanism used to coordinate actuation of the range shift mechanism and the mode shift mechanism for establishing various part-time and on-demand four-wheel drive modes.
Figure 9B:
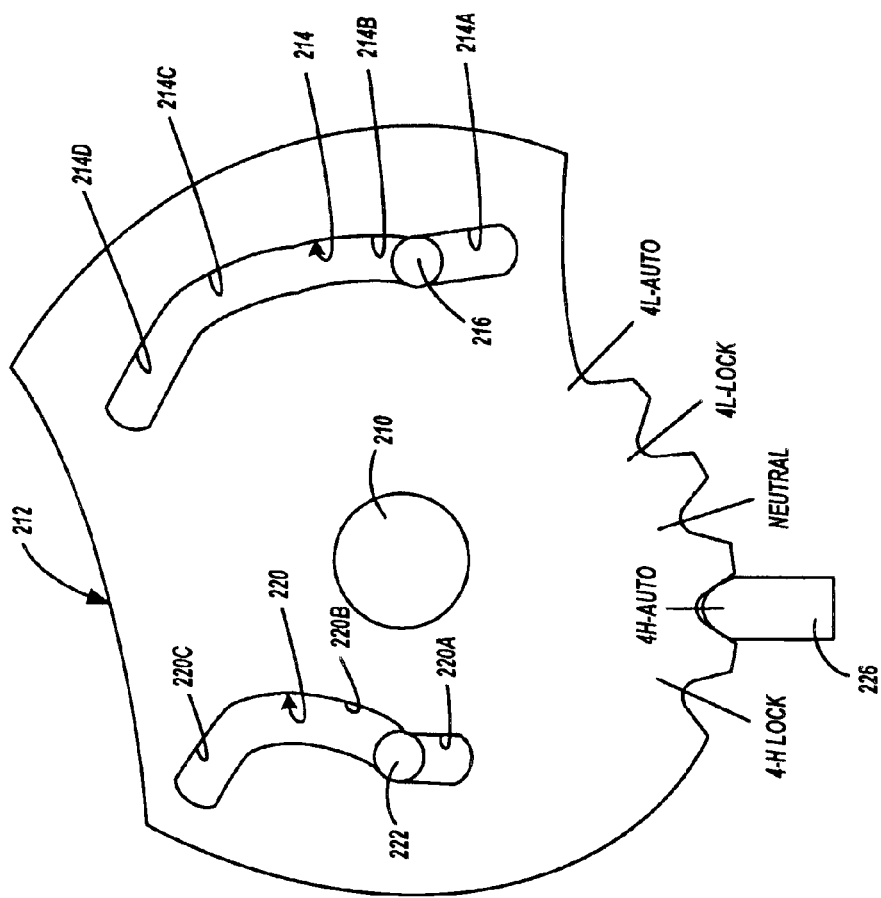

Referring to FIGS. 9A and 9B, sector plate 212 is shown to have five distinct detent positions labeled 4H-LOCK, 4H-AUTO, N, 4L-LOCK and 4L-AUTO. Each detent position corresponds to an available drive mode that can be selected via mode selector 56. In particular, a poppet assembly 226 is shown in FIG. 9A retained in the 4H-LOCK detent of sector plate 212 which represents establishment of the part-time four-wheel high-range drive mode wherein range sleeve 94 is located in its H range position and mode fork 218 is located in a first or LOCK mode position. As seen, range pin 222 is located within a high-range dwell section 220A of range slot 220 and mode pin 216 is located within a first section 214A of mode slot 214. With mode fork 218 in its LOCK position, actuator block 202 is positioned such that ends 192 of drag band 190 engage the edge surfaces of a first segment 204A of camming lug 204. With actuator block 202 in this position, ends 192 of drag band 190 are forcibly separated so as to be located in expanded position of FIG. 7B. Such separation of ends 192 of drag band 190 acts to release the circumferential drag force normally exerted on actuator ring 174.

With drag band 190 released from frictional engagement with rim 184 of actuator ring 174, radial lug 182 is positioned centrally in actuation slot 160 of slipper ring 142. When centrally located, the opposite edges of lug 182 are displaced from end surfaces 162 and 164 of actuation slot 160. As such, relative rotation between front output shaft 30 and rear output shaft 40 in either direction (i.e., front overrunning rear and rear overrunning front) causes a limited amount of relative rotary rotation between slipper ring 142 and outer ring 144. Such limited relative movement causes rollers 146 to ride up the circumferentially indexed cam tracks 166 and 168 which, in turn, causes rollers 146 to exert a radially inwardly-directed clamping force on slipper ring 142, thereby frictionally clamping inner surface 148 of slipper ring 142 to outer surface 150 of drive sprocket 132. Accordingly, clutch assembly 140 is locked and drive sprocket 132 is coupled to rear output shaft 40 such that drive torque is transferred from rear output shaft 40 through transfer assembly 130 to front output shaft 30. In effect, front output shaft 30 is coupled to rear output shaft 40 to establish the part-time four-wheel high-range drive mode.

Referring to FIG. 9B, poppet assembly 226 is shown retained in the 4H-AUTO detent of sector plate 212 which represents establishment of the on-demand four-wheel high-range drive mode wherein range sleeve 94 is still located in its H position and mode fork 218 has moved axially from its LOCK mode position to an AUTO mode position in response to rotation of sector plate 212. Specifically, high-range dwell section 220A of range slot 220 is contoured to maintain range pin 222 at the same axial location along shift rail 114 during rotation of sector plate 212 in the clockwise direction from the 4H-Lock position to the 4H-AUTO position, thereby maintaining range sleeve 94 in its H position. However, the contour of first segment 214A of mode slot 214 causes movement of mode fork 218 from its LOCK mode position into its AUTO mode position. Such movement of mode fork 218 causes actuator block 202 to move to a position where ends 192 of drag band 190 now engage the side surfaces of a second narrower segment 204B of camming lug 204, as shown in FIG. 7A. Contraction of the distance between ends 192 of drag band 190 acts to re-engage the circumferential drag force exerted by drag band 190 on rim 184 of actuator ring 174. Therefore, initial rotation of both output shafts caused by motive operation of the motor vehicle results in circumferential indexing of actuator ring 174 relative to outer ring 144 until lug 182 engages one of end surfaces 162 and 164 of actuation slot 160 in slipper ring 142.

For example, if the vehicle is rolling forward, drive sprocket 132 would rotate counter clockwise and the drag exerted by drag band 190 would cause actuator ring 174 to index in a clockwise direction such that lug 182 would engage end surface 162 of slot 160. In this position, lug 182 prevents rotation of slipper ring 142 in a first direction (i.e., counter-clockwise) relative to outer ring 144 while permitting limited rotation of slipper ring 142 in a second direction (i.e., clockwise) relative to outer ring 144. Since outer ring 144 is driven by rear output shaft 40, and slipper ring 142 is mounted on drive sprocket 132, clutch assembly 140 is maintained in an unlocked condition during relative rotation in the first direction and automatically locks in response to relative rotation in the second direction. Specifically, with lug 182 located adjacent end surface 162 of actuation slot 160 it maintains an alignment between slipper ring 142 and outer ring 144 with rollers 146 maintained centrally in cam tracks 166 and 168. As such, slipper ring 142 is not frictionally clamped to drive sprocket 132, thereby allowing front output shaft 30 to overrun rear output shaft 40. However, if traction is lost at rear wheels 32 and rear output shaft 40 attempts to overrun front output shaft 30, slipper ring 142 moves in the second direction relative to outer ring 144. This limited relative rotation causes rollers 146 to ride up cam surfaces 166 and 168 which acts to frictionally clamp slipper ring 142 to drive sprocket 132, thereby locking clutch assembly 140. This one-way locking function establishes an on-demand four-wheel drive mode during forward motion of the vehicle. The term "on-demand" refers to instantaneous locking of clutch assembly 140 in the event of an interaxle slip condition without any input from the vehicle operator. Once the traction loss condition has been eliminated, clutch assembly 140 is self-releasing to return operation to an unlocked mode, whereby drive torque is again delivered only to rear output shaft 40.

During reverse operation of the vehicle, drive sprocket 132 would rotate clockwise and the drag force would cause actuator ring 174 to circumferentially index until lug 182 is located adjacent to end surface 164 of slipper ring 142. This arrangement is the reverse of that described for forward operation such that limited relative rotation is permitted between slipper ring 142 and outer ring 144 in the first direction but prevented in the second direction. This on-demand four-wheel high-range drive mode also permits front output shaft 30 to overrun rear output shaft 40 during tight cornering while clutch assembly 140 locks to inhibit interaxle slip during lost traction at the rear wheels 32. As such, once the on-demand four-wheel high-range drive mode is established, it is operational during both forward and reverse travel of the vehicle.

When it is desired to shift transfer case 20 from its on-demand four-wheel high-range drive mode into its neutral mode, the appropriate mode signal from mode selector 56 is sent to controller 58 which then sends a control signal to electric motor 206 to rotate sector plate 212 until poppet assembly 226 is located in its N detent. Such rotation of sector plate 212 causes range pin 222 to exit high-range dwell section 220A of range slot 220 and travel within a shift section 220B thereof. The contour of shift section 220B causes range fork 110 to move axially on shift rail 114 which causes corresponding movement of range sleeve 94 from its H position to its N position. Concurrently, mode pin 216 of mode fork 218 exits first section 214A of mode slot 214 and travels within a dwell section 214B thereof which is contoured to maintain mode fork 218 in its AUTO mode position.

When mode selector 56 indicates selection of the part-time four-wheel low-range drive mode, sector plate 212 is rotated until poppet assembly 226 is located in the 4L-LOCK detent position. Assuming the shift sequence required continued rotation of sector plate 212 in the clockwise direction. range pin 222 continues to travel within shift section 220B of range slot 220 which acts to axially move range sleeve 94 from its N position to its L position. Concurrently, mode pin 216 exits dwell section 214B of mode slot 214 and travels within a third section 214C thereof which functions to move mode fork 218 from its AUTO mode position into its LOCK mode position. As previously described, locating mode fork 218 in its LOCK mode position causes a bi-directional locking of clutch assembly 140 to establish the part-time four-wheel low-range drive mode.

Upon selection of the on-demand four-wheel low-range drive mode, sector plate 212 is rotated until poppet assembly 226 is located in its 4L-AUTO detent. Such rotation of sector plate 212 causes range 222 to travel within a low-range dwell section 220C of range slot 220 so as to maintain range sleeve 94 in its L position. Such rotation of sector plate 212 also causes mode pin 216 of mode fork 218 to ride within a fourth section 214D of mode slot 214 which forcibly urges mode fork 218 to move from its LOCK mode position to its AUTO mode position. As previously described, the on-demand four-wheel drive mode is established when mode fork 218 is in its AUTO mode position.

Planetary gearset 42 is arranged to provide a ratio in the range of 2:1 to 5:1 for its low-range. For example, planetary gearset 42 establishes a ratio of about 2.6:1 when sun gear 70 has 55 teeth, ring gear 68 has 89 teeth, and first planet gears 72 each have 17 teeth. Alternately, planetary gearset 42 can have a sun gear 70 with 31 teeth while ring gear 68 has 89 teeth and planet gears 72 each have 29 teeth for defining a 3.9:1 low-range ratio. An arrangement providing the ratio of about 2.6:1 is shown in the upper-half of FIGS. 2 and 3 while the gear arrangement for the 3.9:1 ratio is shown in the lower-half of those drawings.

Figure 10:
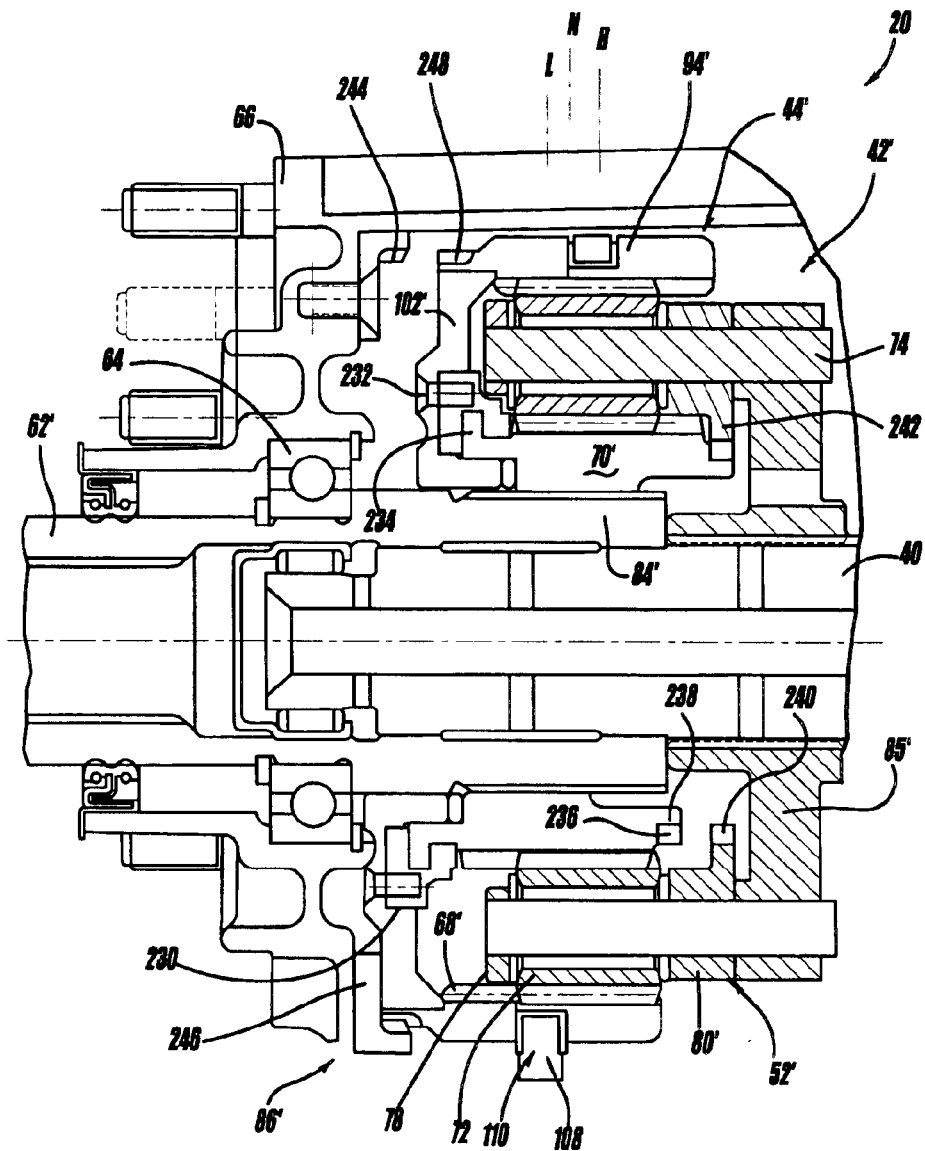
FIG. 10 is a partial sectional view of an alternative preferred embodiment for the planetary gear assembly and the range shift mechanism used in the on-demand power transfer systems of the present invention.

Referring now to FIG. 10, an alternative construction for planetary gearset 42' and range clutch 44' are shown that are adaptable for use in transfer case 20. In particular, sun gear 70' is shown to be fixed via a spline construction 84' for rotation with and axial sliding movement relative to input shaft 62'. In addition, drive ring 85' is shown to be coupled to carrier 52' via pins 74 and also interconnected to rear output shaft 40 by a spline connection. Also, ring gear 68' has plate segment 102' to which a coupling ring 230 is fixed via bolts 232. A radial flange 234 extending from sun gear 70' is retained in a circumferential groove formed in coupling ring 230 so as to permit sun gear 70' to rotate relative to ring gear 68'.

Range clutch 44' includes a range shift mechanism 86' having a range sleeve 94' that is integral with ring gear 68' for causing sliding movement of ring gear 68' and sun gear 70' between three distinct range positions including a low-range position (L), a neutral position (N), and a high-range position (H). Fork segment 108 of range fork 110 is retained in a groove formed in range sleeve 94' such that sector plate 212 is again used to control axial movement of range fork 110 and thus range sleeve 94'. When range sleeve 94' is in it H position. the high-range drive connection between input shaft 62' and carrier 52' is established. This is shown in the upper-half of FIG. 10 with clutch teeth 236 on a clutch ring 238 that is formed integrally with sun gear 70' being engaged with clutch teeth 240 on a clutch ring 242 that is formed integrally with carrier ring 80'. Likewise, the low-range drive connection between input shaft 62' and carrier 52' is shown in the lower-half of FIG. 10 with clutch teeth 244 of a clutch ring 246 fixed to housing 66 engaged with clutch teeth 248 formed on ring gear 68' when range sleeve 94' is in its L position. The neutral mode is established with range sleeve 94' in its N position whereat sun gear 70' is released from coupled engagement with second carrier ring 80' and ring gear 68' is released from braked engagement with housing 66.

Figure 11:
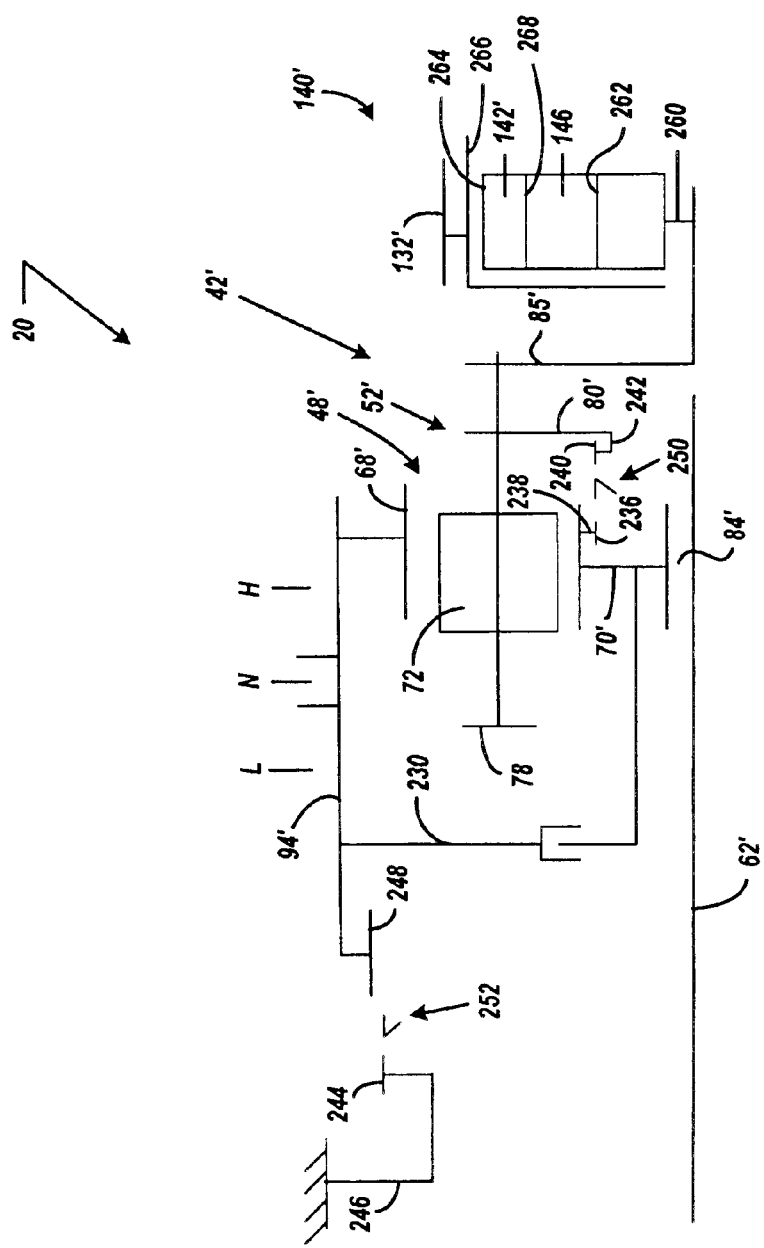
FIG. 11 is a schematic view of synchronized version of the range shift mechanism shown in FIG. 10.
Figure 12:
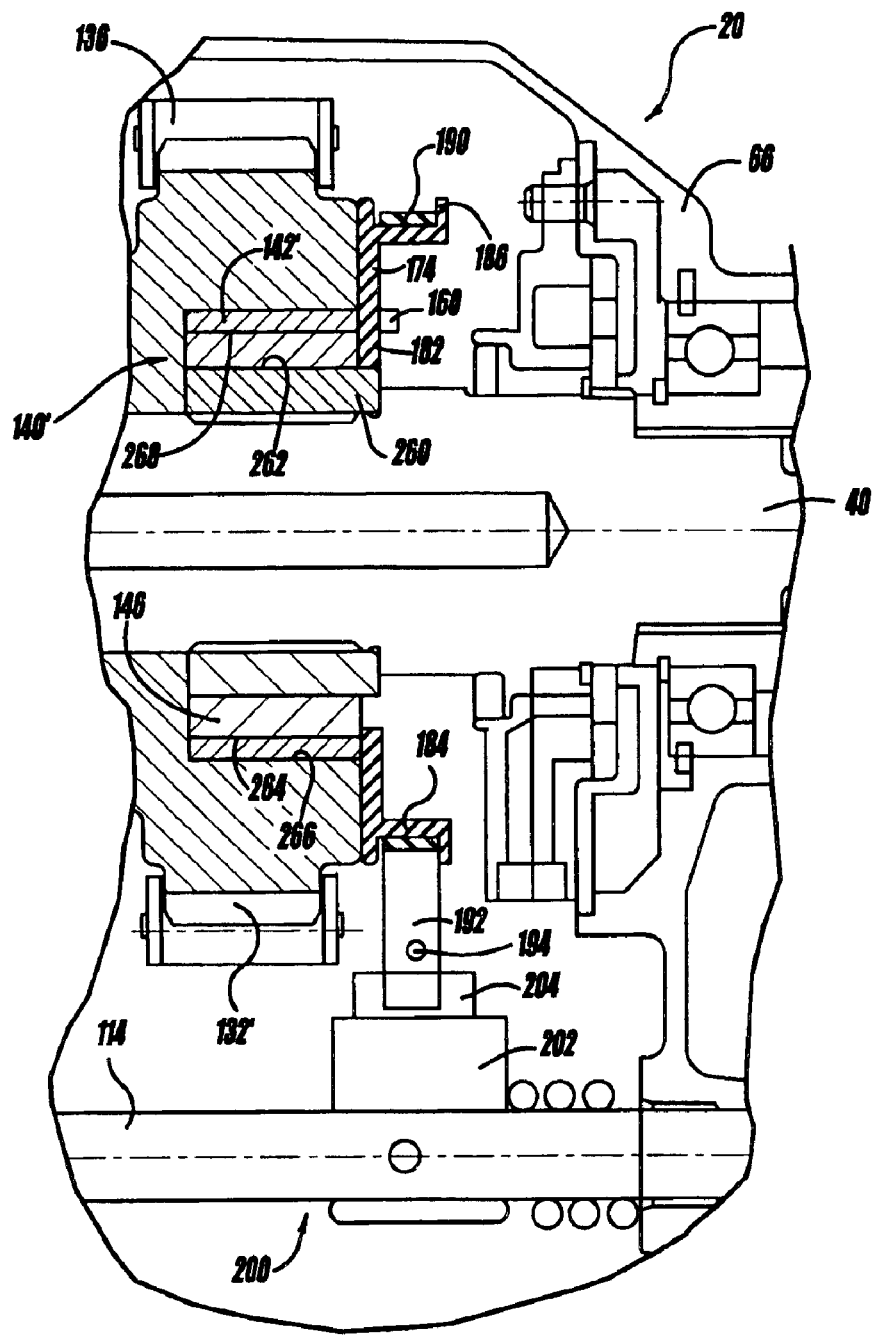
FIG. 12 is a partial sectional view of an alternative preferred embodiment of the multi-mode bi-directional overrunning clutch assembly used in the on-demand transfer cases of the present invention.

FIG. 11 is a schematic illustration of a synchronized version of the range shift arrangement shown in FIG. 10 and a modified arrangement for a controllable, bi-directional, overrunning clutch assembly 140' installed in transfer case 20. The synchronized range shift arrangement is shown to include a first or high-range synchronizer 250 operably installed between clutch ring 238 on sun gear 70' and clutch ring 242 on carrier ring 80'. A second or low-range synchronizer 252 is shown operably disposed between clutch ring 246 and range sleeve teeth 248. Clutch assembly 140' is substantially identical in structure and function to that of clutch assembly 140 except that slipper ring 142' is now positioned above rollers 146. As best seen from FIG. 12, clutch assembly 140' includes a hub 260 fixed (i.e., splined) for rotation with rear output shaft 40 which has outer cam tracks 262 within which rollers 146 are retained. Slipper ring 142' has an outer surface 264 adjacent an inner surface 266 of sprocket 132' and an inner surface defining a plurality of inner cam tracks 268 within which rollers 146 are also retained. Lug 182 of actuator ring 174 is again retained in actuation slot 160 of slipper ring 142' and drag band 190 surrounds rim 184. Thus, in this arrangement, the need for outer ring 144 and drive plate 178 have been eliminated to provide a simpler and more cost effective clutch assembly.

Figure 13:
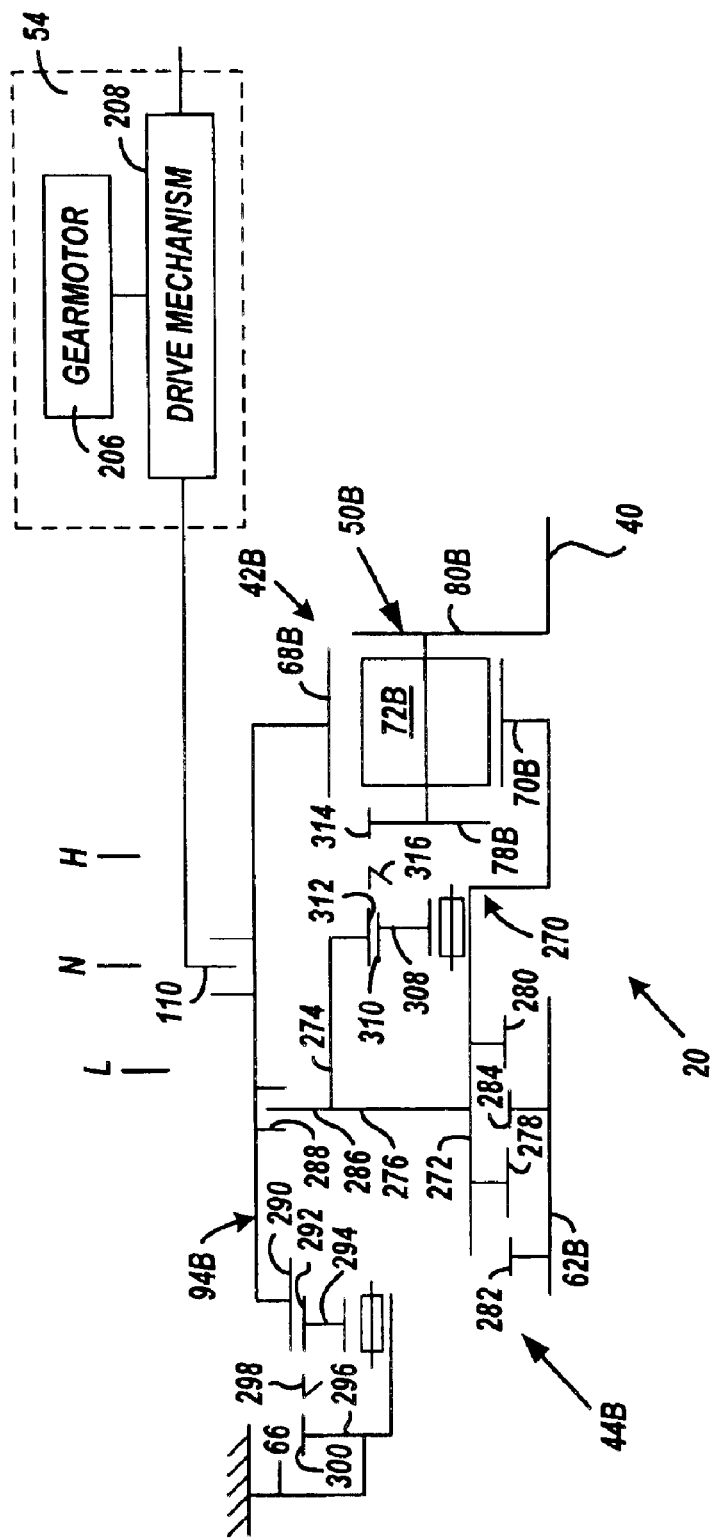
FIG. 13 is a schematic illustration of yet another alternative arrangement for the synchronized range shift system.

Referring now to FIG. 13, a transfer case 20 is schematically shown to include a synchronized range clutch 44B. It is to be understood that range clutch 44B can be used in combination with either version of bi-directional clutch assembly 140 or 140'. Specifically, planetary gearset 42B includes a sun gear 70B, a ring gear 68B and planet gears 72B rotatably supported between carrier rings 78B and 80B defining a carrier 50B. Carrier ring 80B is shown to be fixed for rotation with rear output shaft 40. Sun gear 70B is shown to have a coupling ring 270 fixed thereto which includes an inner cylindrical rim segment 272 and an outer cylindrical rim segment 274 interconnected by a plate segment 276. Inner rim segment 272 has a set of first internal spline teeth 278 which are axially offset from a set of second internal spline teeth 280. Also, input shaft 62B is shown to include a first set of external spline teeth 282 and a second set of external spline teeth 284. A radial lug 286 extending outwardly from outer ring segment 274 is retained in a circumferential groove 288 formed in range sleeve 94B. Ring gear 68B is shown to be fixed to one end of range sleeve 94B such that it and sun gear 70B are axially moveable with range sleeve 94B.

Range sleeve 94B is axially moveable between three distinct range positions (L, N, H) via movement of range fork 110 upon controlled actuation of actuator assembly 54. Range sleeve 94B includes internal clutch teeth 290 which are in constant mesh with external teeth 292 formed on a hub 294. Hub 294 is rotatably supported on a clutch plate 296 that is fixed to housing 66. A synchronizer assembly 298 is disposed between hub 294 and clutch plate 296 and functions to establish speed synchronization therebetween prior to permitting clutch teeth 290 on range sleeve 94B to enter into engagement with clutch teeth 300 on low clutch plate 296 during movement of range sleeve 94B toward its L position. When an available low-range drive mode is selected, gearmotor 206 rotates sector plate 212 of drive mechanism 208 for causing range fork 110 to move range sleeve 94B to its L position. Such movement of range sleeve 94B causes both sets of clutch teeth 278 and 280 on coupling ring 270 to meshingly engage corresponding sets of clutch teeth 282 and 284 on input shaft 62B while also causing its clutch teeth 290 to engage clutch teeth 300 on clutch plate 296. Thus, sun gear 70B is driven by input shaft 62B and ring gear 68B is braked by housing 66 against rotation such that carrier 52 and rear output shaft 40 are driven at a reduced speed.

With continued reference to FIG. 13, synchronized range clutch 44B is further shown to include a clutch hub 308 that is rotatably supported on coupling ring 270 and which has external spline teeth 310 in constant mesh with internal clutch teeth 312 formed in outer ring segment 274 of coupling ring 270. First carrier ring 78B is shown to include clutch teeth 314 that are aligned to receive clutch teeth 312 of coupling ring 270 upon movement of range sleeve 94B to its H position. A synchronizer assembly 316 is disposed between hub 308 and carrier ring 78B and functions to establish speed synchronization between carrier assembly 52B and sun gear 70B prior to engagement of coupling ring teeth 312 with carrier ring teeth 314. When it is desired to establish an available high-range drive mode, range sleeve 94B is moved toward its H position where teeth 278 on coupling ring 270 engage teeth 284 on input shaft 62B such that sun gear 70B is driven by input shaft 62B. Also, upon synchronization, clutch teeth 312 on coupling ring 270 engages clutch teeth 314 on first carrier ring 78B such that a direct drive connection between input shaft 62B and carrier 52B is established. Range sleeve 94B is shown in its N position with coupling ring 270 disengaged from input shaft 62B.

Figure 14:
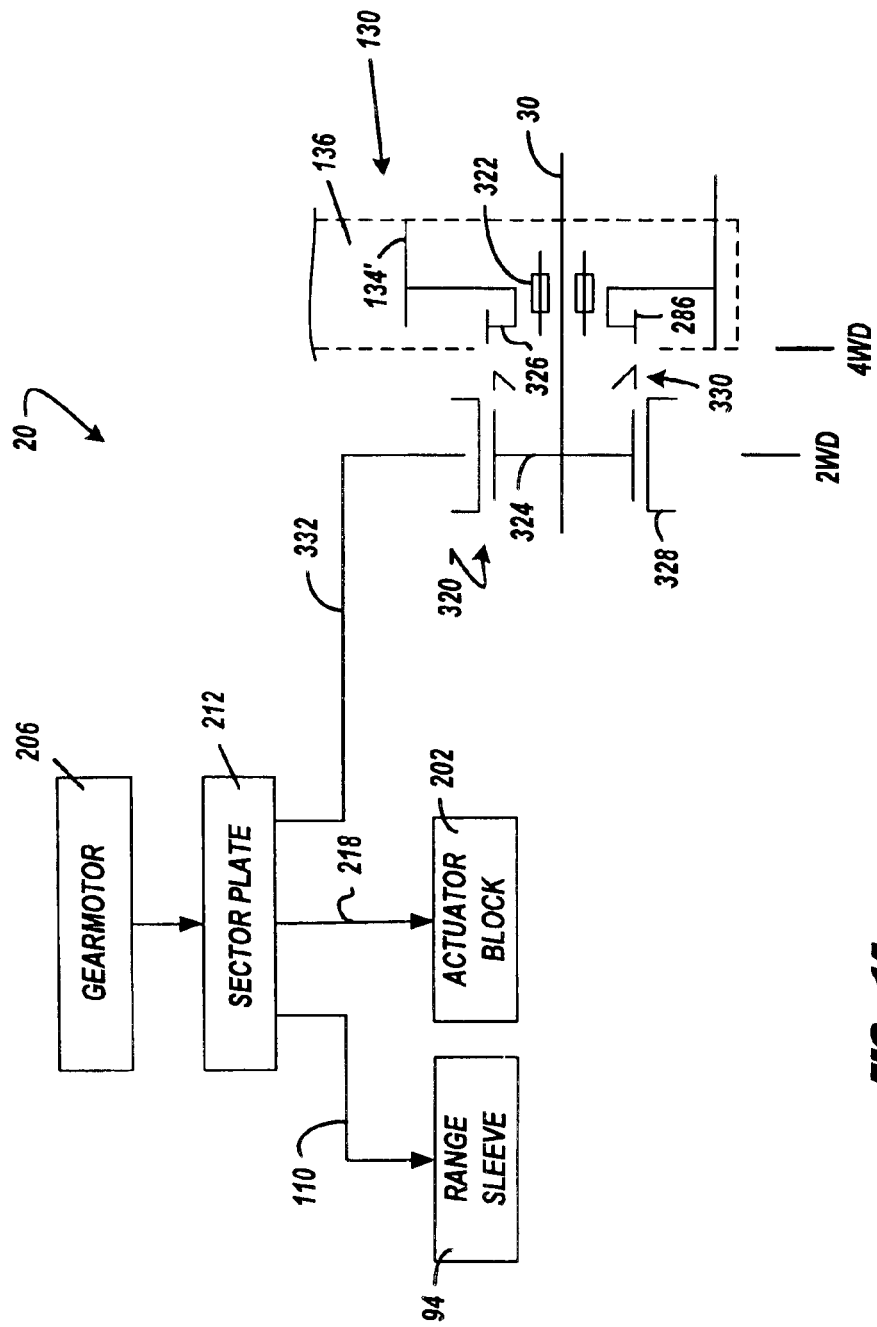
FIG. 14 is a schematic illustration of the transfer cases of the present invention equipped with a disconnect clutch assembly.

Referring now to FIG. 14, a modified version of transfer case 20 shown in FIG. 2 is partially shown in schematic format to now include a disconnect clutch assembly 320 in association with front output shaft 30. As will be detailed, disconnect clutch assembly 320 is operable to selectively couple driven a sprocket 134' of transfer assembly 130 to front output shaft 30. In this arrangement, driven sprocket 134' is rotatably supported on front output shaft 30 via a bearing assembly 322. Driven sprocket 134' is continuously driven by drive sprocket 132 via chain 136. Disconnect clutch assembly 320 is operable in a released mode to establish a two-wheel drive mode wherein all drive torque is transferred to rear output shaft 40. Disconnect clutch assembly 320 is further operable in a locked mode to establish the four-wheel drive modes.

Disconnect clutch assembly 320 includes a hub 324 fixed to front output shaft 30, a clutch ring 326 fixed to driven sprocket 134', a mode sleeve 328 splined for rotation on and sliding movement relative to hub 324, and a synchronizer 330. Mode sleeve 328 is moveable between a two-wheel drive position (2WD) and a four-wheel drive position (4WD) via a second mode fork 332 which would be mounted for sliding movement on shift rail 114. Sector plate 212 would be modified to include a second mode slot with a second mode pin retained therein. Second mode pin would be fixed to second mode fork 332 such that rotation of sector plate 212 also controls movement of mode fork 332 between its 2WD and 4WD mode positions. Sector plate 212 would have an additional detent position, identified in phantom in FIG. 9A as 2H-LOCK, where range sleeve 94 would be located in its H position, mode fork 218 would be in its LOCK position, and mode fork 332 would be in its 2WD position. With mode fork 332 in its 2WD position, mode sleeve 328 is released from engagement with clutch ring 326 such that drive torque delivered to transfer assembly 130 is not transferred to front output shaft 30. Mode select mechanism 56 would permit selection of the two-wheel high-range drive mode in addition to the various four-wheel drive modes previously disclosed. When any of the four-wheel drive modes is thereafter selected, rotation of sector plate 212 would cause mode sleeve 328 to move into its 4WD position whereat driven sprocket 134' is coupled to front output shaft 30 and drive torque from transfer assembly 130 is delivered to front driveline 12.

Figure 15:
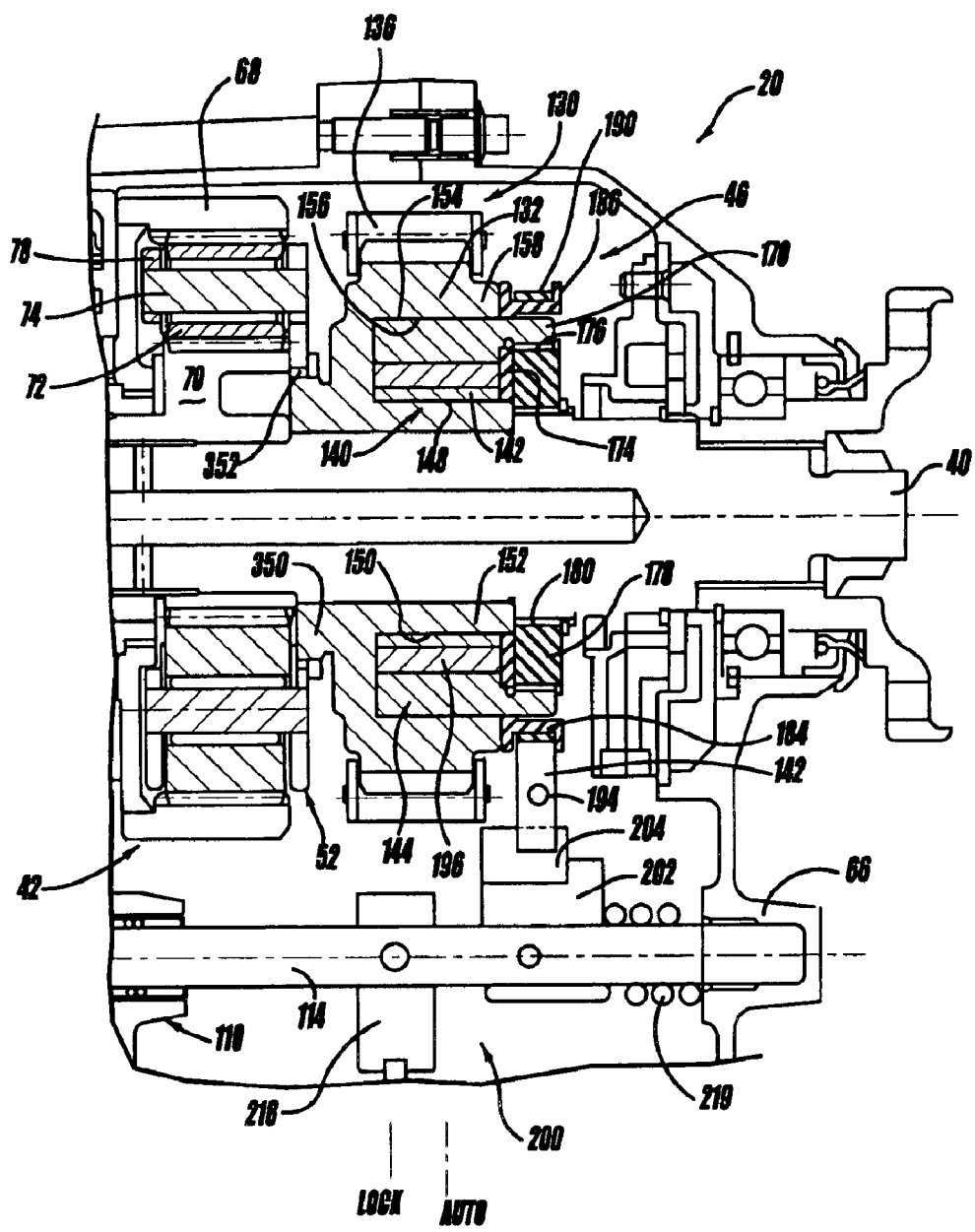
FIG. 15 is a sectional view, similar to FIG. 2, showing a two-speed transfer case according to another alternative embodiment of the present invention.

The previously disclosed embodiments have all been directed to a vehicle having the primary drivelines as rear driveline 14 and the secondary driveline as front driveline 12. However, the present invention also contemplates an arrangement where front driveline 12 is the primary driveline such that drive torque from engine 16 and transmission 18 is normally delivered to front output shaft 30 with establishment of the four-wheel drive modes functioning to transfer drive torque to rear output shaft 40. In this regard, FIG. 15 illustrates a modified version of transfer case 20 shown in FIG. 4 with drive plate 85 eliminated such that carrier ring 80 of carrier 52 is now directly coupled to drive sprocket 132. Specifically, a hub segment 350 of sprocket 132 is fixed via a spline connection 352 to carrier ring 80 such that drive torque is transferred from carrier 52, at either speed ratio, to front output shaft 30 through transfer assembly 130. Since drive plate 178 couples outer ring 144 of bi-directional overrunning clutch assembly 140 to rear output shaft 40, clutch assembly 140 functional as previously described to selectively index slipper ring 142 relative to outer ring 144. However, in this arrangement, drive torque is transferred from sprocket 132 to rear output shaft 40 through slipper ring 142, rollers 146, outer ring 144, and drive plate 178 when rollers 146 ride up cam tracks 166 and 168. As before, movement of actuator block 202 due to movement of mode fork 218 between its LOCK and AUTO mode positions functions to determine whether the part-time or on-demand four-wheel drive mode is established. Obviously, a similar front-wheel drive version of this on-demand system can be used in conjunction with a transfer case equipped with mode clutch assembly 140' of FIG. 12 by simply coupling carrier 52' to drive sprocket 132'.

The foregoing discussion discloses and describes the preferred embodiments for the present invention. However, one skilled in the art will readily recognize from such discussion, and from the accompanying drawings and claims, that various changes, modifications and variations can be made therein without departing from the true spirit and fair scope of the invention as defined in the following claims.

What is claimed is:
1. A transfer case comprising:
an input shaft;
first and second output shafts;
a planetary gear assembly including a sun gear driven by said input shaft, a carrier driving said first output shaft, a ring gear, and a planet gear supported by said carrier and meshed with said sun gear and said ring gear, said ring gear interconnected to said sun gear so as to facilitate relative rotation therebetween and movement of said sun gear in response to movement of said ring gear;

a first clutch plate fixed to said carrier;

a second clutch plate fixed to a stationary member;

a range clutch fixed to said ring gear and moveable between a high-range position and a low-range position to establish corresponding high-range and low-range drive connections between said input shaft and said carrier, said range clutch is operable in its high-range position to couple said first clutch plate for rotation with said sun gear and permit rotation of said ring gear, and said range clutch is operable in its low-range position to release said sun gear from coupled engagement with said carrier and engage said second clutch plate for braking rotation of said ring gear;

a bi-directional overrunning mode clutch operably disposed between said first output shaft and said second output shaft including a mode actuator that is moveable between a first position and a second position to establish corresponding AUTO and LOCK modes, said mode clutch is operable in its AUTO mode to permit relative rotation between said first and second output shafts in a first direction and prevent relative rotation therebetween in a second direction, and said mode clutch is operable in its LOCK mode to prevent relative rotation between said first and second output shafts in both directions; and a shift mechanism for controlling movement of said range clutch and said mode actuator.

2. The transfer case of claim 1 further comprising:

a first synchronizer operably disposed between said sun gear and said first clutch plate for inhibiting movement of said range clutch to its high-range position until speed synchronization is established therebetween; and a second synchronizer operably disposed between said range clutch and said second clutch plate for inhibiting movement of said range sleeve to its low-range position until speed synchronization is established therebetween.

3. The transfer case of claim 1 further comprising:

a power-operated actuator for controlling movement of said shift mechanism;

a mode selector permitting selection of an on-demand high-range drive mode and a part-time high-range drive mode; and a controller receiving mode signals from said mode selector and controlling actuation of said power-operator actuator in response to said mode signals.

4. The transfer case of claim 3 wherein said power-operated actuator includes:

an electric motor having an output rotatably driven in response to control signals from said controller;

a cam rotatively driven by said motor output; and a mode fork operably interconnected between said mode actuator and said cam for causing movement of said mode actuator in response to rotation of said cam so as to shift said mode clutch between its AUTO and LOCK modes.

5. A transfer case comprising:

an input shaft;

first and second output shafts;

a reduction unit having an input member driven by said input shaft, an output member driving said first output shaft, and a reaction member;

a range clutch operable in a first mode to couple said reaction member for rotation with said input shaft to establish a high-range drive connection between said input shaft and said first output shaft, said range clutch is further operable in a second mode to brake rotation of said reaction member to establish a low-range drive connection between said input shaft and said first output shaft, wherein said range clutch includes a first clutch ring coupled to said input shaft, a second clutch ring coupled to a stationary member, and a range sleeve coupled for rotation with said reaction member, said range sleeve is moveable between a high-range position and a low-range position, said range sleeve is operable in its high-range position to couple said reaction member to said first clutch ring and establish said high-range drive connection, and said range sleeve is operable in its low-range position to couple said reaction member to said stationary member and establish said low-range drive connection;

a bi-directional overrunning mode clutch operable in a first mode to permit relative rotation between said first and second output shafts in a first direction and prevent relative rotation therebetween in a second direction, said mode clutch further operable in a second mode to prevent relative rotation between said first and second output shaft in both directions; and a shift mechanism for shifting said range clutch between its first and second modes and said mode clutch between its first and second modes.

6. The transfer case of claim 5 further comprising:

a first synchronizer operably disposed between said first clutch ring and said range sleeve to inhibit movement of said range sleeve into its high-range position until speed synchronization is established between said input shaft and said reaction member; and a second synchronizer operably disposed between said second clutch ring and said range sleeve to inhibit movement of said range sleeve into its low-range position until speed synchronization is established between said reaction member and said stationary member.

7. The transfer case of claim 5 further comprising:

a power-operated actuator for controlling movement of said shift mechanism;

a mode selector permitting selection of an on-demand high-range drive mode and a part-time high-range drive mode; and a controller receiving mode signals from said mode selector and controlling actuation of said power-operator actuator in response to said mode signals.

8. A transfer case comprising:

an input shaft;

a first output shaft driven by said input shaft;

a second output shaft;

a transfer assembly;

a bi-directional overrunning mode clutch operably disposed between said transfer assembly and said first output shaft, said mode clutch is operable in an AUTO mode to permit relative rotation between said first output shaft and said transfer assembly in a first direction and prevent relative rotation therebetween in a second direction, and said mode clutch is operable in a LOCK mode to prevent relative rotation between said first output shaft and said transfer assembly in both directions;

a disconnect clutch operable in a 2WD mode to release said second output shaft from coupled engagement with said transfer assembly and in a 4WD mode to couple said second output shaft for rotation with said transfer assembly; and a shift mechanism for controlling shifting of said mode clutch between its AUTO and LOCK modes and said disconnect clutch between its 2WD and 4WD modes.

9. The transfer case of claim 8 wherein said mode clutch includes a mode actuator that is moveable between first and second position to establish said AUTO and LOCK modes, and wherein said disconnect clutch includes a disconnect actuator that is moveable between first and second positions to establish said 2WD and 4WD modes.

10. The transfer case of claim 9 wherein said shift mechanism is operable to coordinate movement of said mode actuator and said disconnect actuator.

11. The transfer case of claim 9 wherein an on-demand four-wheel drive mode is established when said mode actuator is in its first position and said disconnect actuator is in its second position.

12. The transfer case of claim 9 wherein a part-time four-wheel drive mode is established when said mode actuator is in its second position and said disconnect actuator is in its second position.

13. The transfer case of claim 9 wherein a two-wheel drive mode is established when said mode actuator is in its second position and said disconnect actuator is in its first position.

14. The transfer case of claim 8 wherein said bi-directional overrunning mode clutch includes a first ring driven by said first output shaft, a second ring, and rollers in rolling engagement with facing surfaces of said first and second rings, said second ring adapted to circumferentially index relative to said first ring to cause said rollers to frictionally couple said second ring to said transfer assembly.

15. The transfer case of claim 14 wherein said transfer assembly includes a first sprocket rotatably supported on said first output shaft, and a second sprocket that is rotatably supported on said second output shaft and operably driven by said first sprocket, and wherein said second ring of said mode clutch is adapted to releasably engage said first sprocket.

16. The transfer case of claim 15 wherein said second ring is a split ring defining an actuation slot having first and second end surfaces, and wherein said mode clutch further includes an actuator ring having a lug retained in said actuation slot of said split ring and which is moveable from a central position disengaged from said first and second end surfaces in a first direction into engagement with said first end surface and in a second direction into engagement with said second end surface.

17. The transfer case of claim 16 wherein said actuator ring has a rim on which a drag band is retained, said drag band having a pair of ends between which a cam block is retained, said cam block having a first segment adapted to engage said ends of said drag band so as to cause said drag band to exert a drag force on said rim of said actuator ring which causes circumferential indexing of said actuator ring in response to relative rotation between said first and second rings, said cam block further includes a second segment adapted to engage said ends of said drag band so as to release said drag force from said actuator ring.

18. The transfer case of claim 17 wherein said shift mechanism is operable for moving said cam block between a first position whereat its first segment engages said drag band and a second position whereat its second segment engages said drag band.

19. The transfer case of claim 8 further comprising:

a power-operated actuator for controlling operation of said shift mechanism;

a mode selector permitting selection of an on-demand drive mode and a part-time drive mode; and a controller receiving mode signals from said mode selector and controlling actuation of said power-operator actuator in response to said mode signals.

20. The transfer case of claim 19 wherein said power-operated actuator includes:

an electric motor having an output rotatably driven in response to control signals from said controller;

a cam rotatively driven by said motor output;

a first mechanism connecting said disconnect clutch and said cam such that rotation of said cam controls shifting of said disconnect clutch between its 2WD and 4WD modes; and a second mechanism connecting said mode actuator and said cam such that rotation of said cam controls shifting of said mode clutch between its AUTO and LOCK modes.

21. A transfer case comprising:

an input shaft;

first and second output shafts;

a reduction unit having an input member driven by said input shaft, an output member driving said first output shaft, and a reaction member;

a range clutch operable in a first mode to couple said reaction member for rotation with said input shaft to establish a high-range drive connection between said input shaft and said first output shaft, said range clutch is further operable in a second mode to brake rotation of said member to establish a low-range drive connection between said input shaft and said first output shaft;

a transfer assembly;

a bi-directional overrunning mode clutch operable in a first mode to permit relative rotation between said first output shaft and said transfer assembly in a first direction and prevent relative rotation therebetween in a second direction, said mode clutch further operable in a second mode to prevent relative rotation between said first output shaft and said transfer assembly in both directions;

a disconnect clutch operable in a first mode to couple said second output shaft for rotation with said transfer assembly and in a second mode to release said second output shaft from coupled engagement with said transfer assembly; and a shift mechanism for shifting said range clutch between its first and second modes, said mode clutch between its first and second modes, and said disconnect clutch between its first and second modes.

22. The transfer case of claim 21 wherein said range clutch includes a first clutch ring coupled to said input shaft, a second clutch ring coupled to a stationary member, and a range sleeve coupled for rotation with said reaction member, said range sleeve moveable between a high-range position and a low-range position, said range sleeve is operable in its high-range position to couple said reaction member to said first clutch ring and establish said high-range drive connection, and said range sleeve is operable in its low-range position to couple said reaction member to said stationary member and establish said low-range drive connection.

23. The transfer case of claim 22 further comprising:
a first synchronizer operably disposed between said first clutch ring and said range sleeve to inhibit movement of said range sleeve into its high-range position until speed synchronization is established between said input shaft and said reaction member; and
a second synchronizer operably disposed between said second clutch ring and said range sleeve to inhibit movement of said range sleeve into its low-range position until speed synchronization is established between said reaction member and said stationary member.

24. The transfer case of claim 21 further comprising:
a power-operated actuator for controlling operation of said shift mechanism;
a mode selector permitting selection of at least two different drive modes; and
a controller receiving mode signals from said mode selector and controlling actuation of said power-operator actuator in response to said mode signals.

25. The transfer case of claim 21 wherein said mode clutch includes a mode actuator that is moveable between first and second position to establish corresponding first and second modes, wherein said range clutch includes a range actuator that is moveable between first and second positions to establish corresponding first and second modes; and wherein said disconnect clutch includes a disconnect actuator that is moveable between first and second positions to establish corresponding first and second modes.

26. The transfer case of claim 25 wherein said shift mechanism is operable to coordinate movement of said mode actuator, said range actuator, and said disconnect actuator.

27. The transfer case of claim 25 wherein an on-demand four-wheel high-range drive mode is established when said mode actuator is in its first position, said range actuators in its first position, and said disconnect actuator in its first position.

28. The transfer case of claim 25 wherein a part-time four-wheel high-range mode is established when said mode actuator is in its second position, said range actuator is in its second position, and said disconnect actuator is in its first position.

29. The transfer case of claim 25 wherein a two-wheel high-range drive mode is established when said mode actuator is in its second position, said range actuator is in its first position, and said disconnect actuator is in its second position.

30. The transfer case of claim 21 wherein said bi-directional overrunning mode clutch includes a first ring driven by said first output shaft, a second ring, and rollers engaging facing surfaces of said first and second rings, said second ring adapted to circumferentially index relative to said first ring to cause said rollers to frictionally couple said second ring to said transfer assembly.

31. The transfer case of claim 30 wherein said transfer assembly includes a first sprocket rotatably supported on said first output shaft, and a second sprocket rotatably supported on said second output shaft and operably driven by said first sprocket, wherein said second ring of said mode clutch is adapted to releasably engage said sprocket for selectively transferring drive torque from said first output shaft to said transfer assembly, and wherein said disconnect clutch is operable in its second mode to couple said second sprocket to said second output shaft.

32. The transfer case of claim 30 wherein said second ring is a split ring defining an actuation slot having first and second end surfaces, and wherein said mode clutch further includes an actuator ring having a lug retained in said actuation slot of said split ring and which is moveable from a central position disengaged from said first and second end surfaces in a first direction into engagement with said first end surface and in a second direction into engagement with said second end surface.

* * * * *